United States Patent Office 3,155,166
Patented Nov. 3, 1964

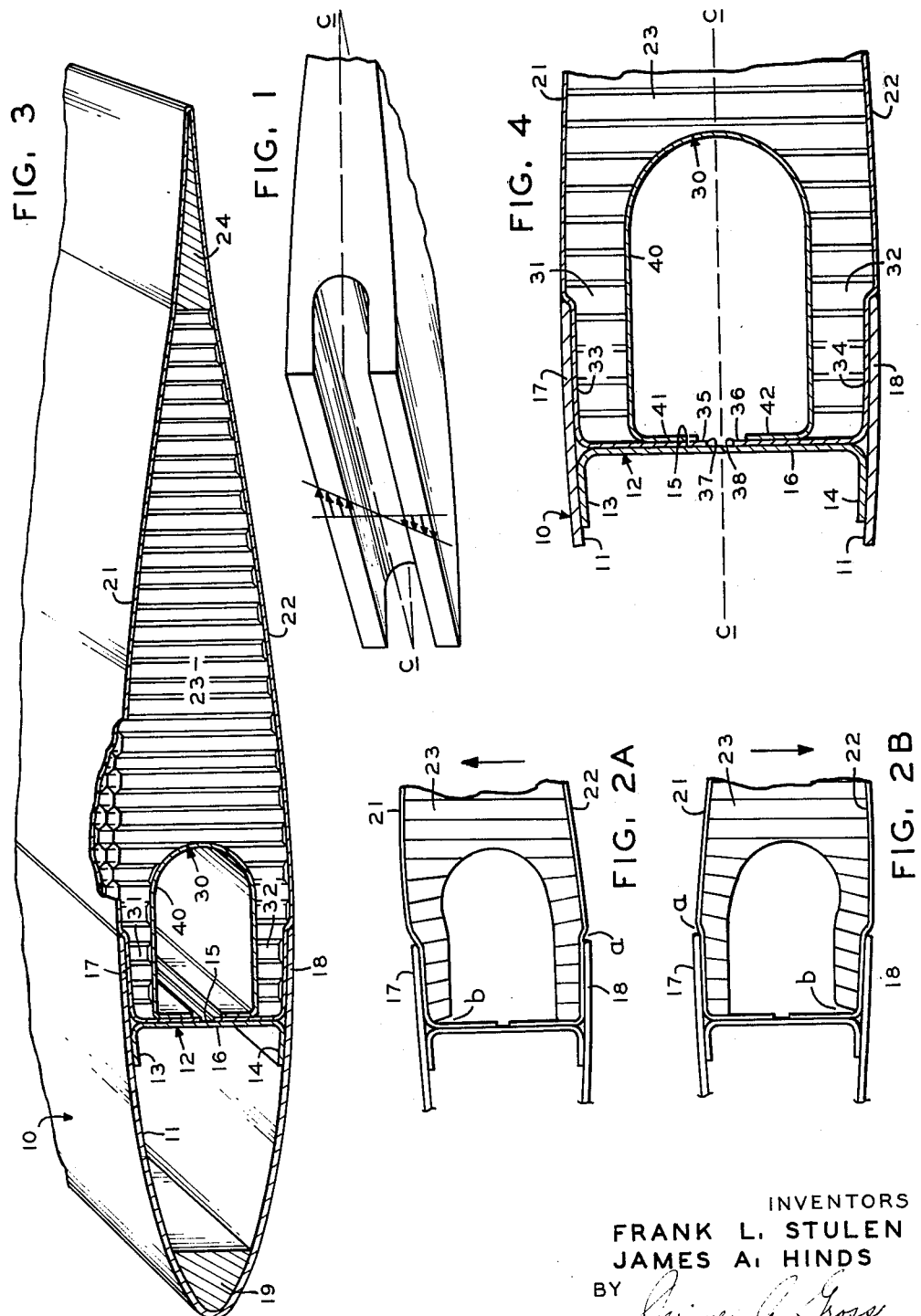

3,155,166
ROTOR BLADE INCLUDING IMPROVED ATTACHMENT OF FILLED AFT STRUCTURE
Frank L. Stulen and James A. Hinds, Traverse City, Mich., assignors to Parsons Corporation, Detroit, Mich., a corporation of Michigan
Filed Sept. 17, 1962, Ser. No. 223,992
4 Claims. (Cl. 170—159)

This invention relates to helicopter rotor blades of the type having a metal spar and a light-weight filled aft structure covered with a structural skin; and particularly to a construction wherein the forward part of a honeycomb aft structure is provided along its span with a throat, to aid in adhesively bonding to the spar.

Every potential source of failure, as by peeling of the adhesive bonds by which aft structure is attached to the spar, should be guarded against. If a throat is provided in aft blade structure, the design should contain provisions assuring that the aft structure will act with the spar in structural unity. To do so, its deflections should be limited to those elastic deflections which necessarily attend transmission of loads.

Two somewhat simplified examples are given below. First: under alternating flapwise bending loads, if the aft structure is to deflect proportionately with distance from the chord plane, consistently with the deflections of the spar web, it is necessary that any structural skin which lines the throat be alternately compressed and extended in a spanwise direction. Second: in carrying loads from the aft structure forward to the spar, deflections of the aft structure in the region of the throat must be resisted by "differential bending" of the beamlike portions above and below the throat; but classic "differential bending" theory requires a moment-resisting, "built-in" attachment of the forward ends of these beamlike portions. In both of these examples, should the attachments of the aft structure be not adequately rigid, the actual deflections may become so excessive as to precipitate failure in the adhesive bonds.

It is the principal purpose of the present invention to overcome such problems of attachment of throated honeycomb aft structures to the spar. In general, the present invention provides a throat skin with flanges which extend inwardly toward the neutral axis, along the aft side of the spar web, and are there adhered through inward-extending flanges of the outer skins.

In the co-pending application of Frank L. Stulen and Alb C. Ballauer, a throat formed in the filled aft structure is utilized to reduce the rigidity of the aft structure sufficiently to deflect the beamlike projections of filler material above and below the throat for secure adhesive bonding outwardly against the aft margins of a steel spar. That principle is utilized in the present invention also; but with the significant new feature that inward flanges of the throat skin liner and of the structural skins are adhered together against the aft face of the spar web. This feature affords rigid end restraints to the forward ends of these beam-like projections, assuring that the throated aft structure will deflect elastically under load only so called for by structural theory. Furthermore, the open throat permits easy attachments of such flanges against the aft face of the spar web.

In the accompanying drawings:

FIGURE 1 is a sketch illustrating the problem of subjecting a throated aft structure to flapwise bending deflection proportionate to the distance from the chord plane which is the neutral axis of a symmetrical airfoil.

FIGURES 2A and 2B are sketches illustrating the problem of deflections of a throated aft structure under reversing normal loads illustrated by the vertical arrows. They show how inadequate attachment would result in deflections exceeding those predicted under classical diffential bending theory.

FIGURE 3 is a fragmentary view, partly in section, of a rotor blade constructed in accordance with the present invention.

FIGURE 4 is a fragmentary sectional view, substantially enlarged, of the structure of FIGURE 3 in the region of the spar attachment.

The general organization of a helicopter rotor blade embodying the present invention is amply illustrated in the fragment shown in FIGURE 3. Such a rotor blade may be of substantially constant cross-section (except for a conventional tip fairing and root attachment) from root to tip, without need for intermediate ribs.

The rotor blade structure so illustrated may be considered as comprising forward blade structure and aft blade structure. The forward structure consists principally of a spar generally designated 10, made up of a steel leading edge plate 11 and a channel 12 having upper and lower flanges 13, 14 brazed within the leading edge plate 11. The aft face 15 of the spar channel web 16 is sufficiently far forward to leave substantial upper and lower spar margins 17, 18 projecting aft thereof along the airfoil mold line. Such a brazed spar is shown in United States Patent No. 3,002,567 to Robert H. Stamm and Frank L. Stulen. For chordwise balance, a leading edge ballast 19 may be added within the forward end of the leading edge plate 11.

The aft structure illustrated consists generally of upper and lower structural skins 21, 22 which, in the embodiment shown, are made of thin aluminum sheet, filled with lightweight filler material, preferably metal honeycomb filler 23 with cells aligned vertically to extend between the skins 21, 22. Its trailing edge consists of the arrowhead shaped full-span trailing edge insert 24, which may be of extruded aluminum or other metal compatible with the remainder of the structure and the manner of assembly. The rearward edges of the upper and lower skins 21, 22 are bonded flush within the sides of the arrowhead insert 24, as illustrated, while its forward side is joined to the aft side of the honeycomb filler 23.

It is conventional to utilize a single main spar in a helicopter rotor blade to carry the major portions of centrifugal loads and the air loads incident to sustentation. Root attachments conventionally utilized contemplate that such originally distributed loads will be directly unloaded from the spar. In order that the unloading take place, such loads must be transferred to the spar in the first place. Considering also that the rotor blade is subjected to extreme distortions cyclically, in flapping, leading, lagging and twisting, attachment of the aft structure should be made so secure as to avoid the possible failure of adhesive bonds.

Such danger of peeling is illustrated somewhat schematically in FIGURES 2A and 2B. If reversing normal (up and down) loads cause excessive deflections, there will be a tendency to peel the adhesive joints of the aft skins 21, 22 from the aft edges of the spar margins 17, 18. Excessive deflections would follow from failure to obtain restraint of the forward ends of the filler material equivalent to the restraint of the end of a "built-in" beam.

The vertical lines aft of the spar web in FIGURES 2A and 2B illustrate the slope that cells of honeycomb filler material would assume if subjected to excessive deflections. Considering FIGURE 2A, if the throat shown were not tightly adhered to the aft surface of the spar, under differential bending the filler material above the throat would be deflected diagonally as shown and the throat would pull back from the aft face 15, leaving a gap $b$. On reversal of the loads, as shown in FIGURE 2B, a similar condition would occur along the juncture of the lower surface of the throat, as illustrated. If a throat surface is permitted to deflect aft, the cells adjacent to it will slope, and that portion of the structure will bear less than a full share of the load. The opposite portion will bear more than its full share, assuming the excess load, until its vertical deflection, is equal to that of the portion which deflects aft.

In the present structure, shown enlarged in FIGURE 4, the forward part of the filler 23 is divided into forwardly-extending upper and lower beam-like portions 31, 32 by a throat-like opening generally designated 30. These beam-like portions 31, 32 extend on either side of the chord plane $c$—$c$, for the symmetrical blade section shown, it is neutral axis for flapwise bending. The upper and lower structural skins 21, 22 cover the upper and lower surfaces of these projections, including inwardly joggled forward parts 33, 34 received within and adhered to the aft spar margins 17, 18. The throat-like opening 30 extends aft substantially beyond the aft edges of spar margins 17, 18. The skins 21, 22 have inward flanges 35, 36 extending toward the chord plane $c$—$c$ and terminating in edges 37, 38 spaced from each other on either side of the chord plane. However, the spacing between the inner edges 37, 38 is substantially less than the depth of the throat-like opening 30.

The entire throat-like opening 30 is lined with a structural skin liner 40, which has inward upper and lower flanges 41, 42 extending inwardly toward the chord plane $c$—$c$ and adhered to the aft side of the forward skin flanges 35, 36. Such throat skin flanges 41, 42, so adhered through the skin flanges 35, 36 to the spar channel web 16, afford attachment to the forward parts 33, 34 equivalent to that of a built-in beam.

Adhesion of the parts in accomplished by conventional adhesives. The procedure for adhering the aft structure to the forward structure is direct. Any suitable type of pressure-exerting mandrel is utilized within the throat-like opening 30 to deflect the upper and lower beam-like portions 31, 32 against the spar margins 17, 18. Forward pressure, exerted within the throat opening against the spar channel web 16, is used to assure secure adhesion of the skin flanges 35, 36 and the throat liner flanges 41, 42.

Comparing FIGURE 1 with FIGURE 4, it is apparent that elastic strain accompanying flapwise bending will be communicated to the throat liner 40 by the adherence of the skin flanges 35, 36 and throat flanges 41, 42. Therefore the aft filler material 30 may act in flapwise bending substantially in accordance with the classic bending theory. Similarly, the adherence of the throat skin flanges 41, 42 will restrain the forward ends 33, 34 securely against sloping, giving them rigidity comparable to built-in beams. With such slope-free end securement, the bending deflection of the upper and lower beam-like projections 31, 32 will tend to conform to classic "differential bending" theory. In this manner, the benefits of utilizing the throat-like opening are achieved, without undue danger of peeling the adhesive joints.

The principles of this invention may be applied not merely to helicopter rotor blades (in respect to the orientation of which the directional terms "upward," "downward," "vertically," etc. are used) but also to other types of airfoils. Detailed modifications for specific utilizations will be obvious. Accordingly, the present invention is not to be construed narrowly, but instead as fully coextensive with the claims hereof.

The terms of the claims are utilized in their meaning as understood by aircraft structural engineers. For example "structural skins" means sheet material chosen in part for its tensile strength; "filler material" means relatively light-weight material (not dense) capable of resisting deflection in shear; and "honeycomb" means thin sheet material so fold and adhered as to form a honeycomb-like filler material. The meaning of all such terms will be understood by persons familiar with the subject matter.

We claim:
1. Airfoil construction for helicopter rotor blades and the like, comprising
   a spar having a web and upper and lower spar margins extending aft of the web,
   in combination with
   aft structure having
   honeycomb filler material having cells aligned vertically and having a forward filler part including a throat-like opening along the chord plane of the airfoil by which the forward filler part is divided into two beam-like projections, one on either side of the chord plane, and having
   structural skins covering the upper and lower surfaces of the forward filler part and extending forwardly inward of the spar margins,
   said skins having inward flanges adhered to the aft surface of the spar web and to the forward edges of the beam-like projections of the forward filler part,
   said inward flanges extending beyond said beam-like projections and terminating in edges spaced apart from each other on either side of the chord plane,
   the throat-like opening having a structural skin liner terminating forwardly in liner flanges extending inwardly toward the chord plane and terminating in edges spaced apart from each other on either side thereof,
   said throat liner flanges being adhered to the aft sides of those portions of the skin flanges which extend inwardly beyond the beam-like projections of the forward filler part,
   whereby strain accompanying flapwise bending is communicated between the spar web and the throat liner.
2. Airfoil construction as defined in claim 1,
   the throat-like opening and its skin liner extending aft of the aft edges of the spar margins,
   the throat liner being rigidly adhered in chordwise tension to the spar web through the throat liner flanges and the skin flanges,
   whereby the attachment of the beam-like projections extending from said liner flanges to the spar margins provides moment-resisting forward end conditions,
   thereby permitting the beam-like projections to carry normal loads, imposed on the structure aft of the throat, forward to the spar web in differential bending.
3. Rotor blade construction comprising
   forward blade structure including
   a spar having a web including an aft face and
   having spar margins extending along the airfoil mold line aft of the web aft face, together with
   aft structure including
   upper and lower structural skins
   having flanges extending inward along and adhered to the aft face of the spar web, and
   filler material between said structural skins,
   a throat in the filler material adjacnt to the aft face of the spar web,
   the throat having a structural skin liner including flanges extending inward along the aft sides of the said flanges of the skins.

4. Rotor blade construction comprising
forward blade structure including
a spar having a web including an aft face and having spar margins extending along the airfoil mold line aft of the web aft face, together with
aft structure including
upper and lower structural skins
having flanges extending inward along and adhered to the aft face of the spar web, and
filler material between said structural skins,
a throat in the filler material along the chord plane of the blade, adjacent to the aft face of the spar web and extending therefrom aft a disance greater than the extent of the spar flanges,
the throat having a structural skin liner
including flanges extending inward toward the chord plane along the aft sides of the said flanges of the skins.

References Cited in the file of this patent
UNITED STATES PATENTS

| | | |
|---|---|---|
| 2,613,893 | Young | Oct. 14, 1952 |
| 2,884,078 | Stamm | Apr. 28, 1959 |
| 3,002,567 | Stulen | Oct. 3, 1961 |
| 3,072,225 | Cremer | Jan. 8, 1963 |